Jan. 13, 1948.  E. A. FOX, JR., ET AL  2,434,557
APPARATUS FOR MOLDING WAX OBJECTS
Filed March 23, 1945
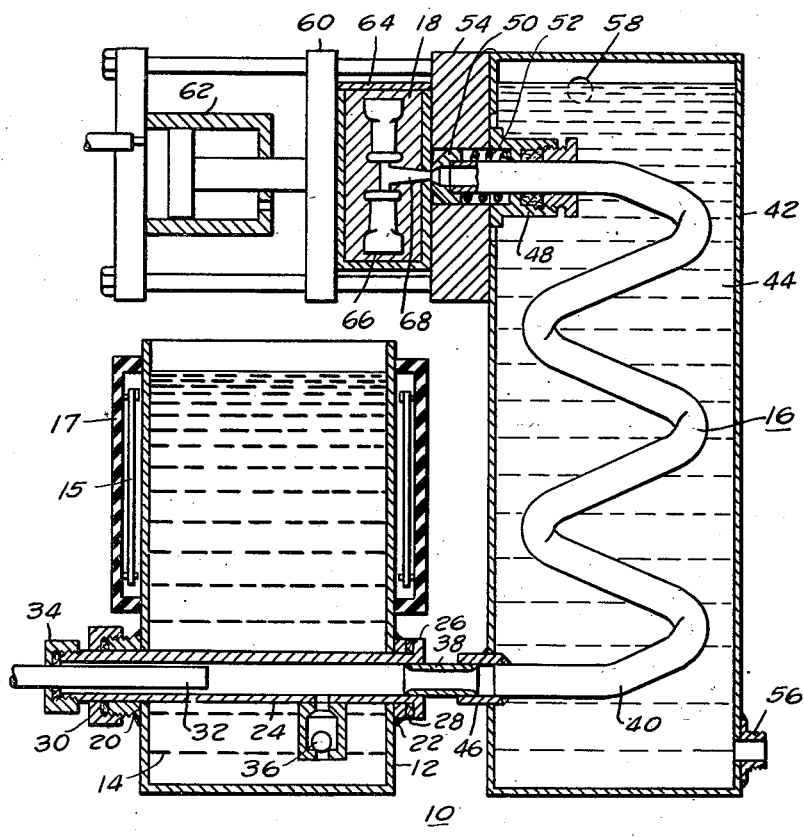
WITNESSES:
INVENTORS
Edward A. Fox, Jr. and
Stanley C. Tingquist.
BY
ATTORNEY Patented Jan. 13, 1948

2,434,557

UNITED STATES PATENT OFFICE 2,434,557

APPARATUS FOR MOLDING WAX OBJECTS

Edward A. Fox, Jr., and Stanley C. Tingquist, Pittsburgh, Pa., assignors to Westinghouse Electric Corporation, East Pittsburgh, Pa., a corporation of Pennsylvania Application March 23, 1945, Serial No. 584,454

4 Claims. (Cl. 18—30)

This invention relates to apparatus for the molding of wax objects for use as patterns in the "lost wax" and precision casting processes for metal casting.

In the "lost wax" and precision casting processes, it is customary to make a wax pattern that is an exact replica of the object which is to be cast and to coat the wax pattern with a refractory material after which the wax is melted from the refractory coating leaving a refractory mold into which metal can be cast.

Heretofore in making the wax patterns, in order to speed up production the wax has been injected into a suitable mold from an injection cylinder which is fed by a reservoir of liquid or partially liquid wax. The wax has been held in the reservoir at substantially the injection temperature with the result that internal and external shrinkage of the pattern is encountered in the mold cavity by reason of the wax cooling from the liquid to the solid state in the mold cavity. Further, it has been found that as the liquid wax is injected into the mold cavity air is entrapped therein imparting imperfect surface areas to the pattern.

Another method which has been utilized in making wax patterns is to feed the wax to the injection cylinder in the form of solid slugs and to then heat the wax in the injection cylinder to render it plastic prior to injecting the wax into the mold cavity. This process, however, has the disadvantage that air is entrapped between the solid wax slugs with the result that the air is present in the cast wax pattern.

An object of this invention is to provide for making wax patterns free from visible shrinkage and air entrapment defects.

Another object of this invention is to provide for so controlling the physical state of the wax that it can be injection molded without detrimental shrinkage while at the same time being free from trapped air.

A further object of this invention is to provide apparatus for controlling the physical state of wax whereby the wax can be injection molded to give patterns free from entrapped air and detrimental shrinkage.

Other objects of this invention will become apparent from the following description when taken in conjunction with the accompanying drawing, the single figure of which is a view in section of apparatus embodying the teachings of this invention.

Referring to the drawing, this invention is illustrated by reference to the molding apparatus 10. The molding apparatus 10 comprises a reservoir 12 for holding a supply of wax 14, an injection cylinder 16 disposed to be supplied therefrom and a mold 18 disposed to be filled from the injection cylinder under predetermined conditions, the components being assembled in cooperative relation with each other.

The reservoir 12 is of any suitable shape and size for holding the supply of wax 14 required for molding a number of patterns. In order to maintain the wax 14 in a molten state in the reservoir 12, heater elements 15 are disposed about the side walls of the reservoir 12 being spaced apart therefrom and carried by a jacket 17 of insulating material mounted on the side walls of the reservoir. The heater elements 15 may be supplied with energy from any suitable source of supply not shown.

As illustrated, the reservoir 12 has two openings in the opposite side walls thereof, the openings being provided with a threaded nipple 20 and a ring bushing 22 for receiving a cylinder 24 which extends through the reservoir. The cylinder 24 has one end flanged as at 26 for seating against a gasket 28 disposed between the flange and the ring bushing 22, the other end of the cylinder 24 extending through the nipple 20 but being secured against movement therein by the threaded cap 30 which engages the threads of the nipple 20. A piston 32 is disposed in the one end of the cylinder 24 being maintained in leakproof position therein by means of the threaded cap 34 disposed in threaded engagement with the end of the cylinder 24. As illustrated, a ball check valve 36 is disposed on the underside of the cylinder 24 adjacent the flanged end thereof, the purpose of the check valve being described more fully hereinafter.

The injection cylinder 16 is in reality formed of a portion of the cylinder 24, a coupling 38 and a spiral shaped tubular member 40, the tubular member 40 being contained or disposed in a receptacle 42 disposed to contain a bath 44 of liquid held at a predetermined temperature. The one end of the tubular member 40 is secured to bushing 46 disposed in one of the sidewalls of the receptacle 42 adjacent the bottom thereof, the coupling 38 effectively connecting the bushing 46 and the flanged end of the cylinder 24. The other end of the tubular member 40 projects through a packed bushing 48 and terminates in a nozzle 50 which is secured to the end of the member 40 in any suitable manner. As illustrated, a spring member 52 is disposed between the nozzle 50 and the bushing 48 for applying pressure to the nozzle 50, the nozzle 50 normally projecting slightly beyond the face of a pressure block 54 within which the nozzle 50 is mounted. The pressure block 54 may be carried by the receptacle 42.

The bath 44 may be of any suitable liquid and in practice is usually water maintained at a predetermined temperature as described hereinafter, the water being admitted to the receptacle 42 through the inlet 56 from any suitable source of supply, not shown, and escaping from the receptacle 42 through the outlet 58 disposed adjacent the upper end of the receptacle 42. Where desired, a recirculating system with suitable mechanism for developing a predetermined temperature in the water may be used for purposes of economy.

Adjacent the pressure plate 54 is a cooperating pressure plate 60 disposed for movement in a direction toward the pressure plate 54 under the influence of a hydraulic ram 62, the pressure plate 60 being utilized for clamping or holding a mold flask 64 in position with respect to the nozzle 50. The flask 64 may be of any suitable type and preferably contains metallic mold members forming the cavities 66 disposed to be supplied from the nozzle 50 through a gate 68. When the flask 64 is in position and retained under pressure between the pressure plates 54 and 60, the nozzle 50 seats against the flask in alignment with the gate 68, the nozzle 50 being held tightly seated thereagainst by the spring 52.

In practice the wax 14 is preferably one of the formulated waxes having a plastic range of from 55° C. to 70° C., such waxes being well known in the art. As an example of such a wax which has been found suitable for this purpose, reference may be had to a formulated wax consisting of a mixture containing 50% paraffin, 45% carnauba and 5% beeswax.

In operation the heater elements 15 develop sufficient heat to effect the melting of the supply of wax 14 in the reservoir 12 and to maintain the molten wax at a temperature of about 100° C. With the wax melted, the pressure of the static head of molten wax forces the check valve 36 to an open position to admit the molten wax into the cylinder 24 and the molten wax flows through the injection cylinder 16 to fill the cylinder. With water being admitted to the receptacle 42, the temperature of the water is so controlled that the tubular member 40 and the wax contained therein are maintained at a temperature ranging between 55° C. and 70° C. to render the wax contained therein plastic. When the apparatus is first utilized, the piston 32 is forced toward the flanged end of the cylinder 24 to force a quantity of the plastic wax through the nozzle 50 to make sure that any air in the cylinder 16 at the time of admission of the wax thereto is forced from the cylinder. This wax can be returned to the reservoir 12 where it is melted.

With the wax held in the tubular member 40 in a plastic state, the mold flask 64 is positioned against the pressure plate 54 and maintained thereagainst by the pressure plate 60 with the nozzle 50 seating against the flask for supplying the plastic wax to the mold cavities 66. Pressure of the order of 600 to 1,000 pounds per square inch is then applied to the piston 32 to cause the ball check valve 36 to move downwardly to prevent the admission of molten wax to the cylinder 24 and to force a quantity of the molten wax through the coupling 38 into the tubular member 40 and a quantity of the plastic wax out of the tubular member 40 through the nozzle 50 to fill the cavities 66 in the mold. It will, of course, be appreciated that the quantity of plastic wax forced through the nozzle 50 will depend upon the size of the mold cavity 66, and this can be determined together with the pressures necessary for complete filling of the mold by experiment for the different mold cavities. In the specific example illustrated in the drawing, the cavity 66 represents turbine buckets, and it is found that a time of 30 to 50 seconds is necessary for filling the mold cavities and maintaining the pressure until the wax in the mold cavity is sufficiently chilled to permit removal of the pattern therefrom.

After the mold cavities 66 are filled with the plastic wax, it is found that the wax immediately changes to a solid state as the molds 18 are of metal and are maintained at room temperature. As soon as the cavities are filled, the piston 32 is retracted before the pressure plate 60 is retracted, it being found that the retraction of the piston 32 causes the check valve 36 to open, and the static head of the supply of molten wax in the reservoir 12 forces the molten wax through the valve 36 to fill the cylinder 24 and replace the wax injected into the mold cavities. As the wax in the tubular member 40 is maintained in a plastic state, it does not flow backwards into the cylinder 24 when the pressure on the piston 32 is released. With the pressure released in this manner, the pressure plate 60 may be retracted, and the mold flask 64 removed and an unfilled mold flask replaced for the next injection operation.

In replacing the filled mold flask with an unfilled flask, it is found that the plastic wax will not flow from the nozzle 50 as the pressure is removed from the wax in the injection cylinder when the piston 32 is retracted. Further, it is found that the wax injected into the mold cavity is free of any air entrapment for as is apparent the system is a closed system beginning with the molten wax up to the time that the plastic wax is injected into the mold cavity. Further with the wax in a plastic state and injected into the mold cavity, it is found that the plastic wax flows smoothly and freely into the mold cavity without excessive turbulence. Since the wax is in a plastic state as it is injected into the mold cavity and solidifies quickly by reason of the temperature drop encountered in the mold, the shrinkage in the resulting pattern cast in the mold cavity is at a minimum.

It will, of course, be appreciated that many different types of waxes can be utilized in the operation of the apparatus described hereinbefore and that the bath 44 for maintaining the wax plastic in at least the major part of the injection cylinder may be any suitable liquid, and that its temperature can be maintained substantially constant in any suitable commercial manner. The apparatus of this invention is highly efficient and makes possible the production of large quantities of wax patterns with very few rejects.

We claim as our invention:

1. Apparatus for the molding of wax objects comprising, in combination, a reservoir for holding a supply of molten wax, an injection cylinder comprising a receiving cylinder having a piston disposed for displacement therein and a tubular member forming a continuation thereof, the receiving cylinder being disposed in the reservoir to receive molten wax therefrom, a valve carried by the receiving cylinder for controlling the admission of the molten wax thereto, and temperature controlling means disposed about the tubular member for maintaining the tubular member and the wax therein at a substantially constant temperature below the melting point but above the solidification point of the wax to render and maintain the wax therein in a plastic state, the piston, valve and temperature controlling means cooperating to maintain the space in the receiving cylinder and the tubular member filled with wax except for the displacement of the piston.

2. Apparatus for the molding of wax objects comprising, in combination, a reservoir for holding a supply of molten wax, an injection cylinder comprising a receiving cylinder having a piston disposed for displacement therein and a tubular member forming a continuation thereof, the receiving cylinder being disposed in the reservoir to receive molten wax therefrom, a valve carried by the receiving cylinder for controlling the admission of the molten wax thereto, temperature controlling means disposed about the tubular member for maintaining the tubular member and the wax therein at a substantially constant temperature below the melting point but above the solidification point of the wax to render and maintain the wax therein in a plastic state, the piston, valve and temperature controlling means cooperating to maintain the space in the receiving cylinder and the tubular member filled with wax except for the displacement of the piston, and a mold having a mold cavity therein removably disposed to be supplied with plastic wax from the tubular member as the piston is displaced in a predetermined manner.

3. Apparatus for the molding of wax objects comprising, in combination, a reservoir for holding a supply of wax, means associated with the reservoir for maintaining the wax in a molten state in the reservoir, an injection cylinder comprising a receiving cylinder having a piston disposed for displacement therein and a tubular member forming a continuation thereof, the receiving cylinder being disposed in the lower portion of the reservoir to receive molten wax therefrom under the static pressure of the supply of wax, a check valve carried by the receiving cylinder for controlling the admission of the molten wax thereto, and temperature controlling means disposed about the tubular member for maintaining the tubular member and the wax therein at a substantially constant temperature below the melting point but above the solidification point of the wax to render and maintain the wax therein in a plastic state, the piston, valve and temperature controlling means cooperating to maintain the space in the receiving cylinder and the tubular member filled with wax except for the displacement of the piston.

4. Apparatus for the molding of wax objects comprising, in combination, a reservoir for holding a supply of wax, means associated with the reservoir for maintaining the wax in a molten state in the reservoir, an injection cylinder comprising a receiving cylinder having a piston disposed for displacement therein and a tubular member forming a continuation thereof, the receiving cylinder being disposed in the lower portion of the reservoir to receive molten wax therefrom under the static pressure of the supply of wax, a check valve carried by the receiving cylinder for controlling the admission of the molten wax thereto, temperature controlling means disposed about the tubular member for maintaining the tubular member and the wax therein at a substantially constant temperature below the melting point but above the solidification point of the wax to render and maintain the wax therein in a plastic state, the piston, valve and temperature controlling means cooperating to maintain the space in the receiving cylinder and the tubular member filled with wax except for the displacement of the piston, and a mold having a mold cavity therein removably disposed to be supplied with plastic wax from the tubular member as the piston is displaced to apply pressure thereto, the check valve cooperating as the piston is displaced to release pressure from the plastic wax to admit molten wax under static pressure to fill the receiving cylinder.

EDWARD A. FOX, Jr.
STANLEY C. TINGQUIST.

REFERENCES CITED

The following references are of record in the file of this patent:

UNITED STATES PATENTS

| Number | Name | Date |
|---|---|---|
| 2,216,188 | Dons et al. | Oct. 1, 1940 |
| 2,245,640 | Beattie | June 17, 1941 |
| 2,207,426 | Bailey | July 9, 1940 |
| 1,696,656 | Tornberg | Dec. 25, 1928 |